(12) United States Patent
Katsuki et al.

(10) Patent No.: US 7,250,740 B2
(45) Date of Patent: Jul. 31, 2007

(54) METHOD AND APPARATUS FOR GENERATING PULSE-WIDTH MODULATED WAVEFORM

(75) Inventors: Tomoya Katsuki, Kawasaki (JP); Masashi Tsubota, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 221 days.

(21) Appl. No.: 11/097,208

(22) Filed: Apr. 4, 2005

(65) Prior Publication Data

US 2005/0190005 A1    Sep. 1, 2005

(51) Int. Cl.
*H02P 27/04*    (2006.01)
(52) U.S. Cl. .................. 318/810; 318/801; 318/808; 318/809; 318/254; 700/1; 700/7
(58) Field of Classification Search ............... 318/801, 318/808, 807, 809, 810, 254; 700/1, 7
See application file for complete search history.

(56) References Cited

U.S. PATENT DOCUMENTS 4,144,447 A * 3/1979 Fossum et al. ............... 377/52
5,933,344 A * 8/1999 Mitsuishi et al. ............. 700/13
6,614,208 B2 * 9/2003 Narita ........................ 323/283
6,643,156 B2 * 11/2003 Zubieta ...................... 363/132
7,117,384 B2 * 10/2006 Chen et al. ................. 713/600

FOREIGN PATENT DOCUMENTS

| JP | 8-263104 | 10/1996 |
|----|----------|---------|
| JP | 10-112982 | 4/1998 |
| JP | 11-75375 | 3/1999 |
| JP | 2002-335679 | 11/2002 |

* cited by examiner

*Primary Examiner*—Rita Leykin
(74) *Attorney, Agent, or Firm*—Young & Thompson

(57) ABSTRACT

In a method of generating pulse-width modulated waveform, the cycle of a carrier wave for the waveform is determined together with a first dead time value and a second dead time value both of which are set in a plurality of up-down counters, respectively. Using the plurality of up-down counters is effective to assign individual dead times to upper and lower arms and to linearly control a PWM duty from 0% to 100%.

12 Claims, 14 Drawing Sheets

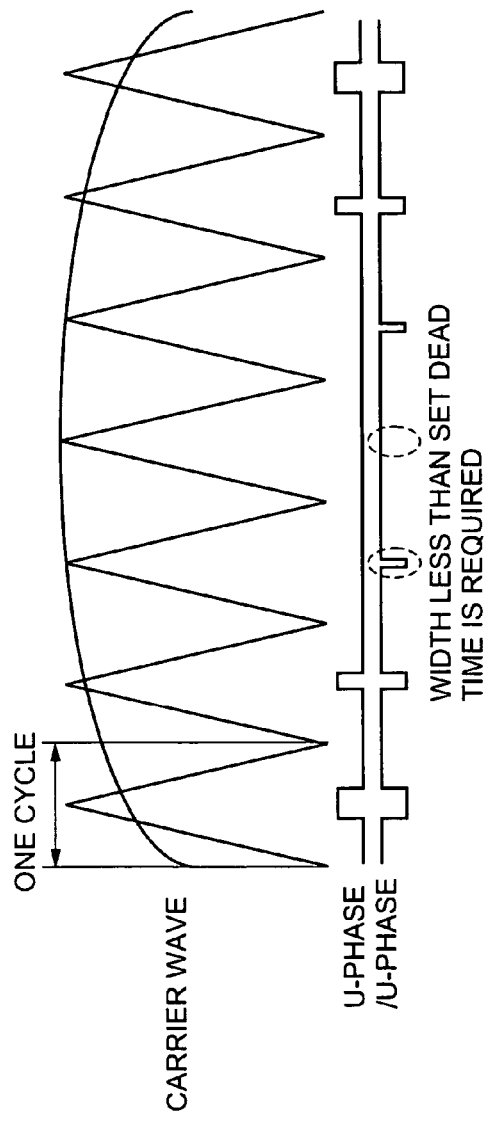
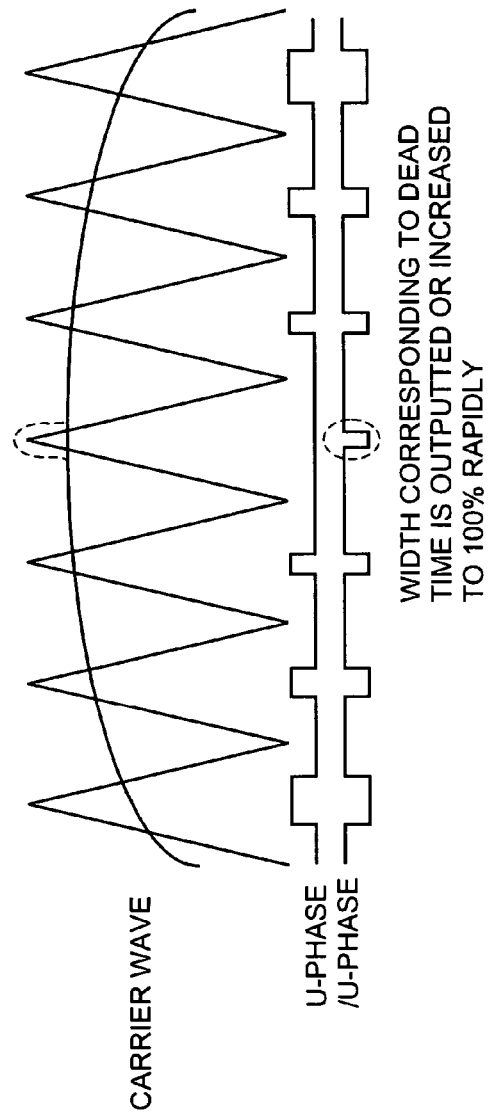

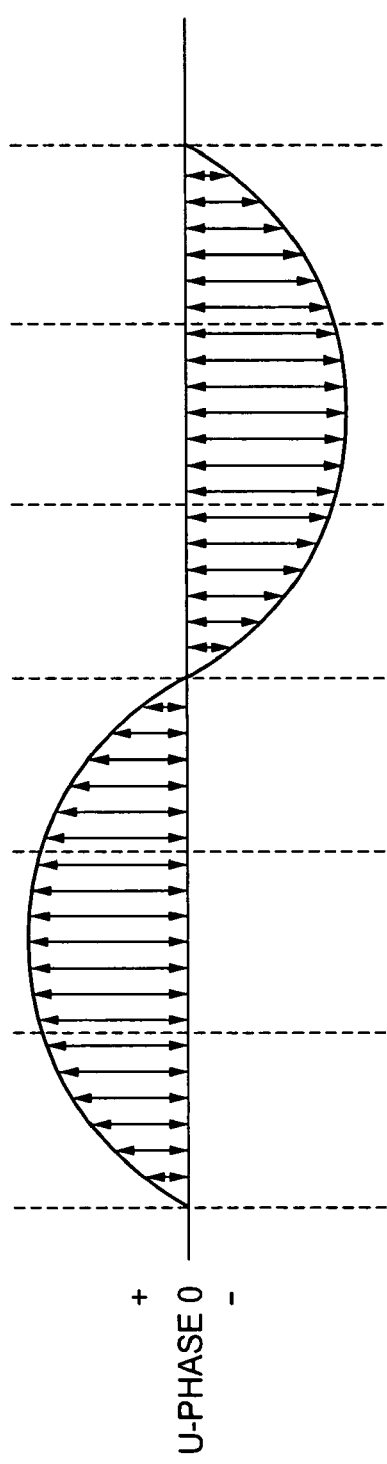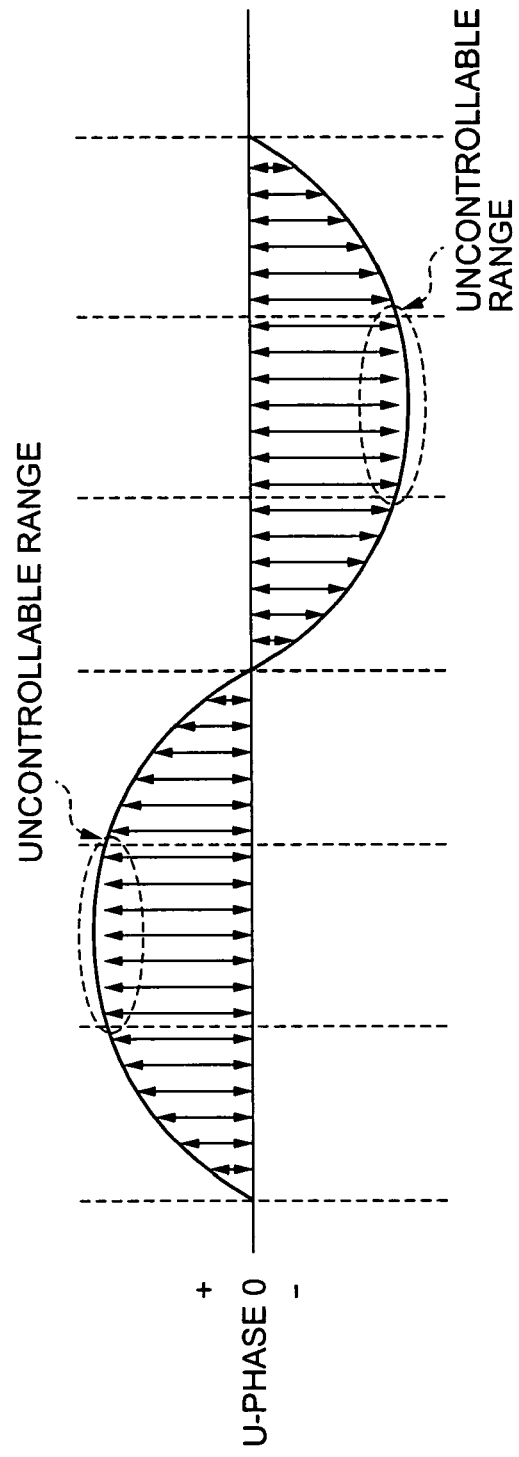

US 7,250,740 B2

METHOD AND APPARATUS FOR GENERATING PULSE-WIDTH MODULATED WAVEFORM

This application claims priority to prior Japanese patent application JP 2003-351349, the disclosure of which is incorporated herein by reference.

BACKGROUND OF THE INVENTION

The present invention relates to a three-phase pulse-width modulated waveform generator, and in particular, it relates to a three-phase pulse width modulation generator used in pulse-width modulation (hereinafter, referred to as PWM) inverters that control alternating current motors and the like at variable speed.

A PWM inverter shown in FIG. 9 is generally used to control a three-phase motor. An alternating power source 301 is first converted to a desired DC voltage by an AC/DC converter circuit 302. Then the DC voltage is converted to three-phase AC voltage to be supplied to coils of motor 306 by switching six power transistors (represented by switches in FIG. 9) included in an upper arm 304 adjacent to a high-potential supply voltage and a lower arm 305 adjacent to a low-potential supply voltage. In FIG. 9, the upper arm 304 and the lower arm 305 construct a power module 303.

As shown in FIG. 10, a three-phase alternating voltage of U-phase, V-phase, and W-phase is reconstructed from a PWM voltage of U-phase, V-phase, and W-phase that is generated by modulating the pulse width of a triangular carrier signal. The six power transistors are driven by a U-phase PWM signal, a /U-phase PWM signal, a V-phase PWM signal, a /V-phase PWM signal, a W-phase PWM signal, and a /W-phase PWM signal outputted from a microcomputer-controlled three-phase pulse-width modulated waveform generator.

As shown in FIG. 11, the relationship between U and /U, V and /V, and W and /W needs to be complementary (when one is ON, the other is OFF). Specifically, the /U-phase PWM signal is the complementary signal of the U-phase PWM signal, the /V-phase PWM signal is the complementary signal of the V-phase PWM signal, and the /W-phase PWM signal is the complementary signal of the W-phase PWM signal. Two transistors that correspond to each other in the upper and lower arms are turned on and off complementarily for each of the U-phase, V-phase, and W-phase, thereby performing push-pull operation. The U-phase, V-phase, and W-phase needs to be displaced by an electrical angle of 120 degrees, as shown in FIG. 12.

When the upper arm 304 and the lower arm 305 formed by the six power transistors are turned on at the same time, short current or excessive current is caused to flow through both the upper and the lower arms 304 and 305. To prevent it, it is necessary to provide short-circuit prevention time, or dead time, for each of the U-phase, V-phase, and W-phase, between ON and OFF and between OFF and ON of the respective output waveforms of the U-phase PWM signal and the /U-phase PWM signal, the V-phase PWM signal and the /V-phase PWM signal, and the W-phase PWM signal and the /W-phase PWM signal. For example, Japanese Unexamined Patent Application Publication No. 10-112982 (FIG. 1) discloses a technique of generating a PWM waveform that has a dead time set in a delay circuit between ON and OFF and between OFF and ON of the upper arm and the lower arm.

Its structure is shown in FIG. 13. An up-down counter 401 is operated by a count clock 404. When the value of a rewritable comparing register 402 and the value of the up-down counter 401 are coincident with each other, a coincidence detection signal 408 is outputted from a comparator 403 into a delay circuit 405, and the delay circuit 405 starts the operation of counting the dead time for preventing a short circuit.

When a control signal 415 is outputted from an output-polarity control circuit 413 into the delay circuit 405 when the output polarity of the PWM signal is switched, then the delay circuit 405 starts to count the dead time. When the dead-time counting operation has been finished, a delay signal 410 is outputted from the delay circuit 405.

A waveform generation section 406 is supplied from the up-down counter 401 with a count direction signal 409 indicative of whether the counting direction is an up-count direction or a down-count one. In addition, the waveform generation section is also supplied with the coincidence detection signal 408, the delay signal 410, and a control signal 414 indicative of the output polarity of the PWM signal from the output-polarity control circuit 413. A U-phase PWM signal 411 and a /U-phase PWM signal 412 are outputted from the waveform generating section 406 via tristate buffers controlled by an output stop signal 407.

In positive polarity, the U-phase PWM signal 411 outputs logic level 1 according to the coincidence detection signal 408 during up-count and outputs logic level 0 according to the delay signal 410 by the coincidence detection signal 408 during down-count. In opposite polarity, the U-phase PWM signal 411 outputs logic level 0 according to the delay signal 410 by the coincidence detection signal 408 during up-count and outputs logic level 1 according to the coincidence detection signal 408 during down-count. It outputs logic level 1 according to the control signal 415 when the polarity is switched from the positive polarity to the opposite polarity and outputs logic level 0 according to the delay signal 410 by the control signal 415 when the polarity is switched from the opposite polarity to the positive polarity.

In positive polarity, the /U-phase PWM signal 412 outputs logic level 0 according to the delay signal 410 by the coincidence detection signal 408 during up-count and outputs logic level 1 according to the coincidence detection signal 408 during down-count. In opposite polarity, the /U-phase PWM signal 412 outputs logic level 1 according to the coincidence detection signal 408 during up-count and outputs logic level 0 according to the delay signal 410 by the coincidence detection signal 408 during down-count. It outputs logic level 0 according to the delay signal 410 by the control signal 415 when the polarity is switched from the positive polarity to the opposite polarity and outputs logic level 1 according to the control signal 415 when the polarity is switched from the opposite polarity to the positive polarity.

This structure ensures dead time for preventing a short circuit so that the power transistor in the upper arm and the power transistor in the lower arm are not turned on at the same time. As the same applies to the generation of the V-phase and /V-phase PWM signals and the W-phase and /W-phase PWM signals, a description thereof will be omitted here but the up-down counter 401 is shared among the three phases.

The power transistor in the upper arm and that in the lower arm are different from each other in drive ability, or switching time. Under the circumstances, in order to reduce the time that both of the power transistors in the upper arm and the lower arm are off and thereby to provide optimum complementary switching, it is necessary to individually set the dead time for the upper arm and the dead time for the lower arm.

The three-phase pulse-width modulated waveform generator of the related art, shown in FIG. 13, can select any dead time. However, the illustrated generator has only one delay circuit that determines the dead time and which is common to both the upper arm and the lower arm. In addition, the dead time can not be individually and controllably set at each of the upper and the lower arms. As a result, the dead time for the upper arm is identical with that for the lower arm.

Accordingly, a common dead time must be set for the upper arm and the lower arm in consideration of a longer switching time. This results in the problem of increasing the time that both of the power transistors of the upper arm and the lower arm are kept off and makes it difficult to achieve optimum complementary switching.

It has recently been required in controlling the inverter of an electric power steering system (EPS) and a hybrid electric vehicle (HEV) not only to allow the dead time for the upper and lower arms to be set individually but also to allow linear control of PWM duty (output width of PWM in one cycle of the carrier wave) from 0% to 100% output.

FIG. 14A shows a desired output signal. FIG. 14B shows an output that can be achieved by a related art. The /U-phase requires a PWM signal output shorter than the set dead time, or 0%, as shown as the area surrounded by the dotted line in FIG. 14A. However, in the related art, a PWM signal has a set dead-time width, as shown in FIG. 14(B) or is quickly changed to 100%.

As described above, the related art has not been allowed to provide output control within the range from a set dead-time width to 100%, or 0%. Accordingly, it cannot provide an ideal inverter control, shown in FIG. 15(A), due to generation of an uncontrollable range as in the inverter control of FIG. 15(B). This makes it difficult to linearly control the PWM duty from 0% output to 100% output.

SUMMARY OF THE INVENTION

The invention has been made in consideration of the above-described problems. Accordingly, it is an object of the invention to provide a three-phase pulse-width modulated waveform generator capable of setting individual dead times for the upper arm and the lower arm and to enable linear control of the PWM duty from 0% output to 100% output.

In order to achieve the above object, the invention provides the following method and apparatus for generating pulse-width modulated waveforms through first and second terminals.

According to a first aspect of the invention, there is provided a method of generating pulse-width modulated waveforms through the first and the second terminals. The method includes the step 1 of determining the cycle of a carrier wave for the waveforms, a first dead time value, and a second dead time value, the step 2 of determining the range of counting by a plurality of up-down counters according to the carrier-wave cycle, the first dead time value, and the second dead time value, the step 3 of counting in the range determined by the up-down counters in the step 2, the step 4 of comparing a value determined according to the carrier-wave cycle with a first count value of a first one of the up-down counters, the step 5 of comparing a value determined according to the carrier-wave cycle with a second count value of a second one of the up-down counter other than the first up-down counter, and the step 6 of generating the pulse-width modulated waveforms according to the comparison in the steps 4 and 5.

It is preferable that the first dead time value be determined for the first terminal while the second dead time value be determined for the second terminal. The method further includes the step of loading the first count value of the first up-down counter in the second up-down counter. In this case, the first up-down counter may perform counting in a range in which a half of the first dead time value is a first lower limit and the sum of a half of the first dead time value and a half of the carrier-wave cycle is a first upper limit, the second up-down counter may perform counting in a range in which zero is a second lower limit and the sum of a half of the first dead time value, a half of the second dead time value, and a half of the carrier-wave cycle is a second upper limit. When the first count value is either of the first upper limit and the first lower limit, the first count value may be loaded in the second up-down counter.

It is preferable that the first dead time value be a dead time at the time of switching from positive phase OFF to negative phase ON, the second dead time value be a dead time at the time of switching from negative phase OFF to positive phase ON, and when a third up-down counter measures the cycle of the carrier wave, the first up-down counter performs counting with a time difference of the first dead time value relative to the third up-down counter, and the second up-down counter performs counting with a time difference of the second dead time value relative to the third up-down counter. In this case, the first up-down counter may perform counting in a range in which the sum of the first and second dead time values is a first lower limit and the sum of the first lower limit and a half of the carrier-wave cycle is a first upper limit, and the second up-down counter may perform counting in a range in which zero is a second lower limit and a half of the carrier-wave cycle is a second upper limit.

According to a second aspect of the invention, there is provided an apparatus for generating pulse-width modulated waveforms through first and second terminals. The apparatus includes a plurality of up-down counters that perform counting in a range determined according to a predetermined carrier-wave cycle, first dead time value, and second dead time value, a first comparator that compares a value determined according to the carrier-wave cycle with a first count value of a first one of the up-down counters, a second comparator that compares a value determined according to the carrier-wave cycle with a second count value of a second up-down counter other than the first up-down counter, and a waveform generator that generates pulse-width modulated waveforms through the first and the second terminals according to the outputs of the first and the second comparators.

It is preferable that the first dead time value be determined for the first terminal, the second dead time value be determined for the second terminal, and the apparatus further include means for loading the first count value of the first up-down counter in the second up-down counter. In this case, the first up-down counter may perform counting in a range in which a half of the first dead time value is a first lower limit and the sum of a half of the first dead time value and a half of the carrier-wave cycle is a first upper limit, the second up-down counter may perform counting in a range in which zero is a second lower limit and the sum of a half of the first dead time value, a half of the second dead time value, and a half of the carrier-wave cycle is a second upper limit, and when the first count value is either of the first upper limit and the first lower limit, the loading means may load the first count value in the second up-down counter.

It is preferable that the first dead time value be a dead time at the time of switching from positive phase OFF to negative phase ON, the second dead time value be a dead time at the time of switching from negative phase OFF to positive phase ON, and the apparatus include a third up-down counter that measures the cycle of the carrier wave as one of the plurality of up-down counters, wherein the first up-down counter performs counting with a time difference of the first dead time value relative to the third up-down counter, and the second up-down counter performs counting with a time difference of the second dead time value relative to the third up-down counter. In this case, the first up-down counter may perform counting in a range in which the sum of the first and second dead time values is a first lower limit and the sum of the first lower limit and a half of the carrier-wave cycle is a first upper limit, and the second up-down counter may perform counting in a range in which zero is a second lower limit and a half of the carrier-wave cycle is a second upper limit.

According to other aspects of the invention, there are provided an apparatus for generating multiphase alternating pulse-width modulated waveform, which includes the above-described pulse-width modulated waveform generation apparatus and a multiphase alternating-current motor driven by the apparatus for generating the multiphase alternating pulse-width modulated waveforms.

According to embodiments of the invention, the dead time values for the upper arm and the lower arm can be set individually. Also, the PWM duty can be controlled from 0% to 100% output.

This allows appropriate setting of the dead time according to the switching capability of the power module and also allows efficient control of ON time of the power module. As shown in FIG. 15A, a pseudo or false PWM sinusoidal wave can be brought close to an ideal or true sinusoidal wave. This reduces the OFF time (waste time=undriven time) of the power module, increasing the total torque to provide energy savings. Accordingly, the invention is advantageous for all fields including electrical household appliance.

Furthermore, since the motor rotates by inertia during dead time, the shorter the dead time, the smoother sinusoidal wave the three-phase alternating waveform becomes. According to embodiments of the invention, the dead time can be held to the minimum, so that the vibration of the motor is reduced and so noises can be prevented. Also, the loss in energy due to the generation of noises can be suppressed.

When the dead time is set one time before the start of operation, the PWM waveform having dead time can be generated automatically. This lightens the processing load imposed on the software and so, particularly in microcomputers of slow CPU processing time, reduces an influence on other software processing.

BRIEF DESCRIPTION OF THE DRAWINGS

FIG. 14A is a diagram for explaining the waveform of an output signal required for a PWM waveform generator;

FIG. 14B is a diagram for explaining the waveform of a signal generated by a related-art PWM waveform generator;

FIG. 15A is a diagram for explaining the output range of a signal required for a PWM waveform generator; and FIG. 15B is a diagram for explaining the output range of a signal generated by a related-art PWM waveform generator.

DESCRIPTION OF THE PREFERRED EMBODIMENTS

[Principle of the Present Invention]

Figure 1A:
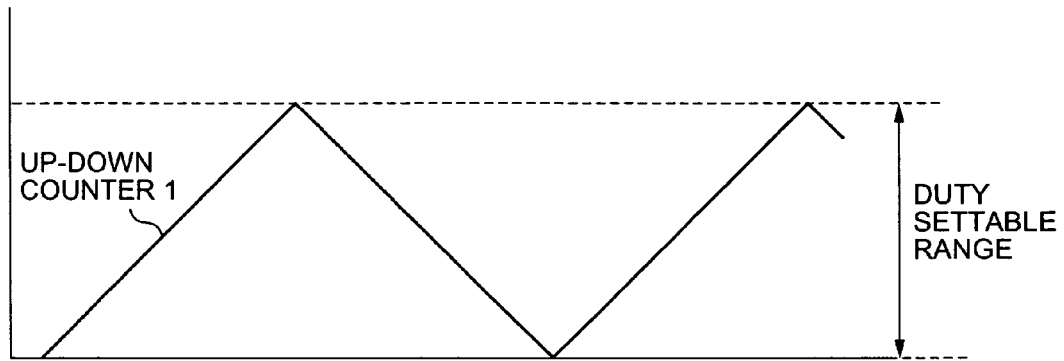
FIGS. 1A and 1B are diagrams for explaining the extension of a duty settable range according to an embodiment of the invention.
Figure 1B:
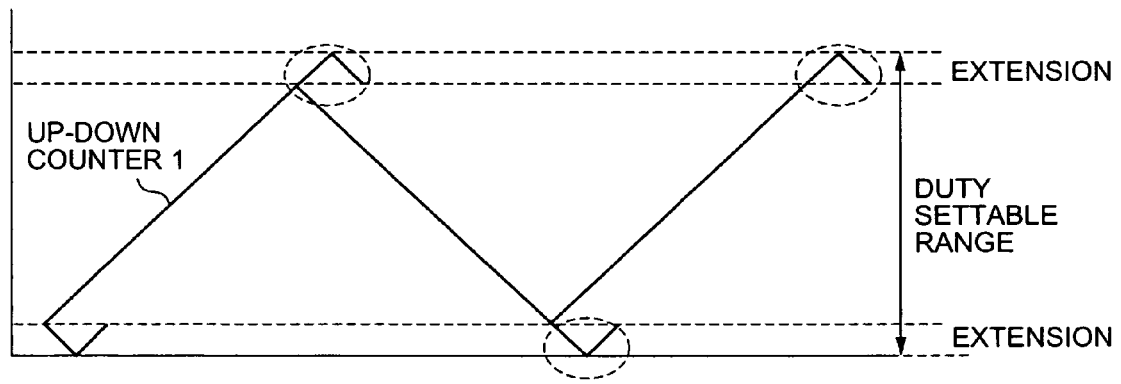
Figure 13:
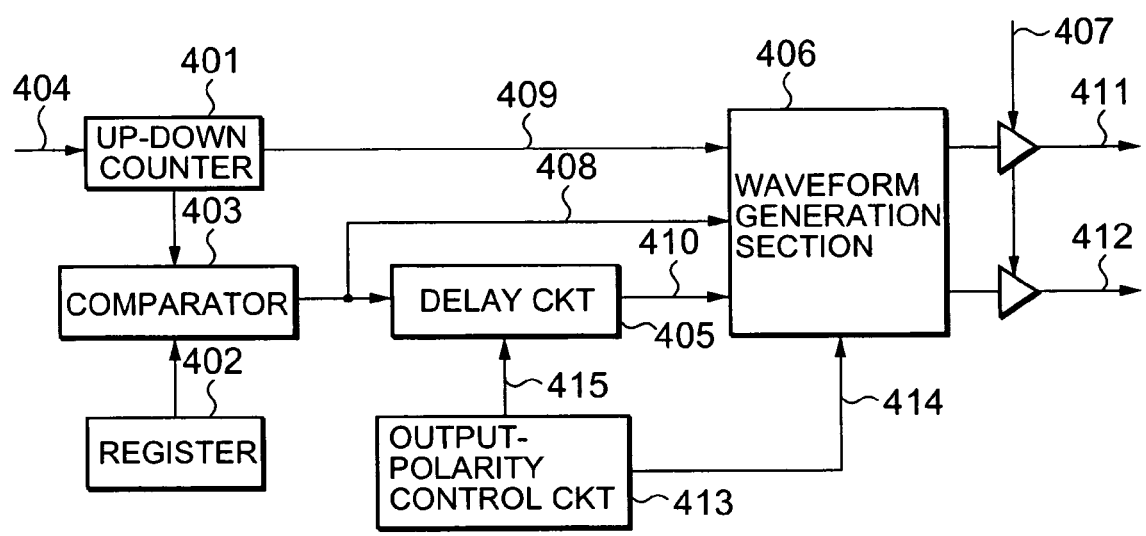
FIG. 13 is a functional block diagram of a related-art PWM waveform generator.

In related arts, the output in /U-phase varies rapidly from (a dead time value set for a delay circuit 405 (FIG. 13)) to (0) while the value of the comparing register varies from (1) to (0). To prevent it, as shown in FIG. 1B, one-half offset of the delay circuit is added to the operation of the up-down counter to extend the range that can be set for the comparing register. For the range to which the offset is added, another up-down counter is operated to allow duty control.

Thus, the invention allows PWM control in a duty range that cannot be controlled in the related arts by adding offset to the up-down counter, by adding another up-down counter operable within a range that could not be controlled, and by generating a coincidence signal between the added up-down counter and the comparing register.

The invention allows individual dead times to be set for each of the upper arm and the lower arm, and allows the PWM duty to be set linearly from 0% output to 100% output.

[First Embodiment]

Figure 2:
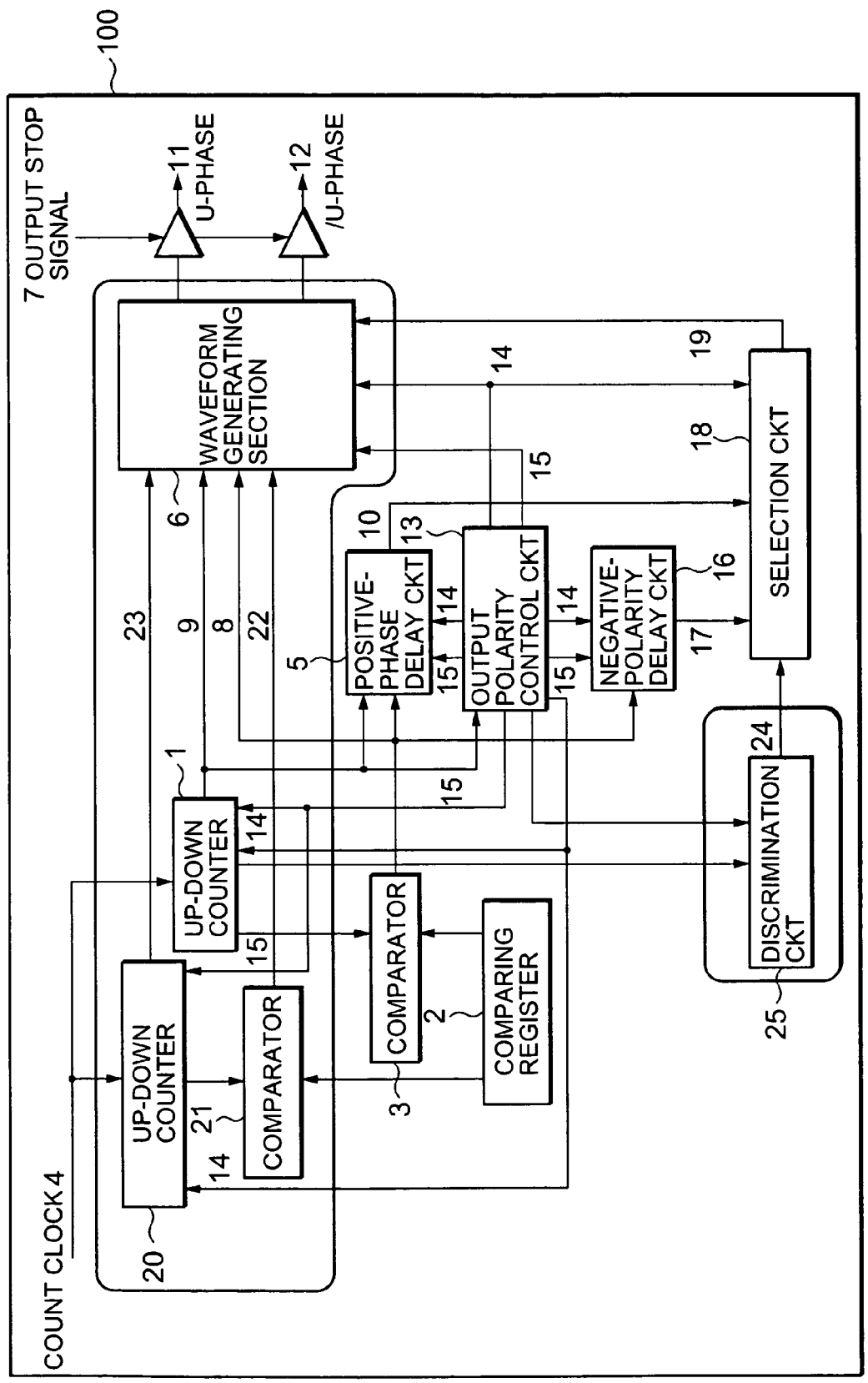
FIG. 2 is a functional block diagram for explaining a three-phase pulse-width modulated waveform generator according to a first embodiment of the invention.

A three-phase PWM waveform generator 100 according to a first embodiment of the invention will be described with reference to FIG. 2. The three-phase PWM waveform generator 100 includes an up-down counter 1, a comparing register 2, a comparator 3, a positive-phase delay circuit 5, a waveform generating section 6, an output-polarity control circuit 13 a negative-phase delay circuit 16, a selection circuit 18, an up-down counter 20, a comparator 21, and a discrimination circuit 25.

Figure 3:
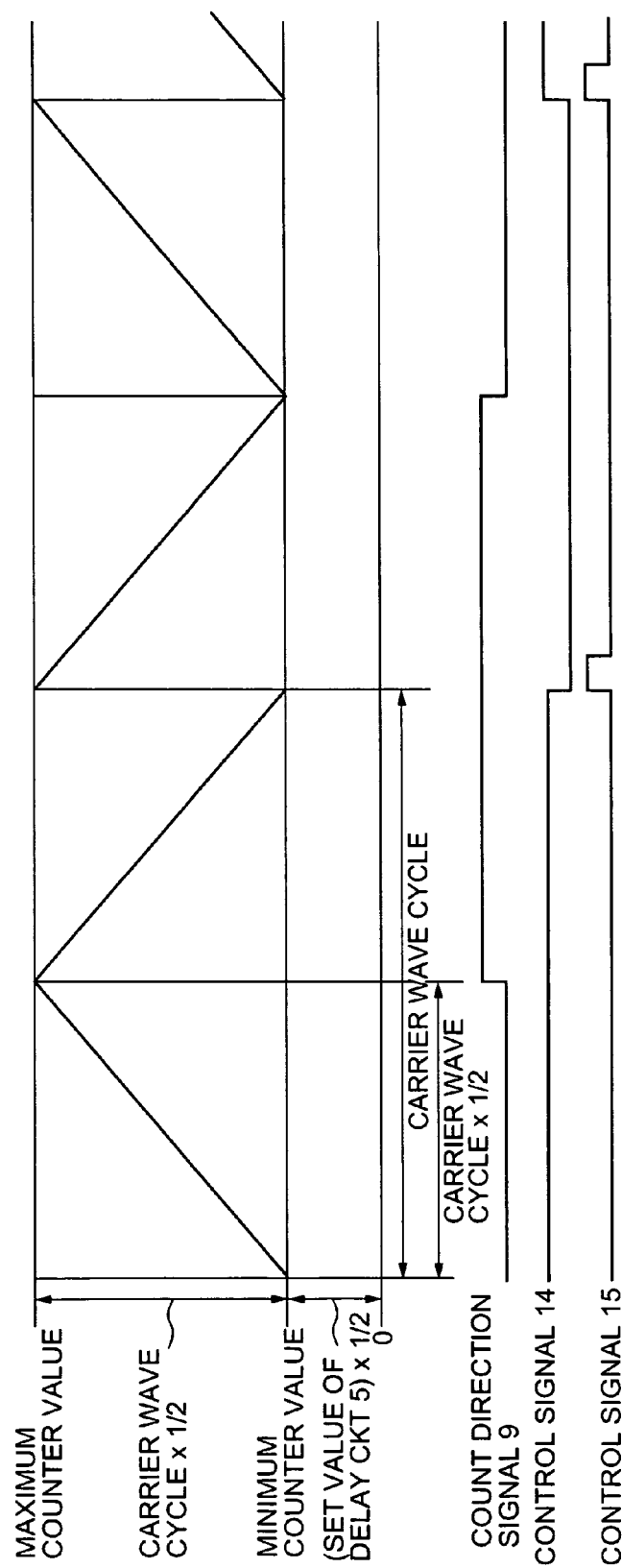
FIG. 3 is a diagram for explaining the operation of an up-down counter.

The up-down counter 1 is operated by a count clock 4 to perform an up-down counting operation, shown in FIG. 3, in the range from ((the set value of the positive-phase delay circuit 5)/2) to ((the cycle of a carrier wave)/2+(the set value of the positive-phase delay circuit 5)/2). The up-down counter 1 outputs an alternate upward and downward triangular wave in a cycle of the carrier wave. The direction of the crest of the triangular wave is determined depending on the polarity of the output of the PWM signal indicated by a control signal 14, specifically, with reference to both or either of the control signals 14 and 15. The up-down counter 1 outputs a count direction signal 9 indicative of either up-count operation or down-count operation, to the waveform generating section 6 and the discrimination circuit 25. The count direction signal 9 is kept at 0 during the up-count operation, namely, while the count increases within the count range from the lower limit ((the set value of the positive-phase delay circuit 5)/2) to the upper limit ((the cycle of a carrier wave)/2+((the set value of the positive-phase delay circuit 5)/2). Conversely, during the down-count operation, namely, while the count decreases from the upper limit to the lower limit, the count direction signal 9 is kept at 1, as shown in FIG. 3.

The comparing register 2 is a rewritable register, in which the duty width of the PWM waveform is stored.

The comparator 3 compares the value of the up-down counter 1 with the value of the comparing register 2. When both the values become equal to each other, the comparator 3 outputs a coincidence detection signal 8 to the positive-phase delay circuit 5, the waveform generating section 6, and the negative-phase delay circuit 16.

The positive-phase delay circuit 5 starts a counting operation when either of the following two conditions, namely, start conditions 1 and 2, is satisfied.

[Start Condition 1] When the count direction signal 9 is held at 0, the positive-phase delay circuit 5 starts a counting operation at the timing when the coincidence detection signal 8 is given.

[Start Condition 2] When the control signal 14 changes from 1 to 0, the positive-phase delay circuit 5 starts the counting operation at the timing when the control signal 15 is given.

In either case, the positive-phase delay circuit 5 outputs a delay signal 10 to the selection circuit 18 when the count reaches a dead time value set for the upper arm.

The waveform generating section 6 outputs a U-phase signal 11 and a /U-phase signal 12 through first and second terminals, respectively, in response to the inputs of the coincidence detection signal 8, the count direction signal 9, the control signal 14, the control signal 15, the delay signal 19, an additional coincidence detection signal 22, and an additional count direction signal 23. AT any rate, the waveform generating section 6 is operable in accordance with control logic shown in Tables 1 and 2.

The waveform generating section 6 operates in principle according to the control logic on Table 1 and determines the outputs of the U-phase signal 11 and the /U-phase signal 12 in response to the count direction signals 9 and 23.

On the other hand, the waveform generating section 6 operates on the basis of the control logic shown in Table 2 at the timing when the output polarity of the PWM signal changes from one to another (namely, the timing when the control signal 14 changes from positive polarity (1) to reversed polarity (0) and the timing when the control signal 14 changes in the direction opposite thereto).

TABLE 1

| count direction signal 9 | count direction signal 23 | U-phase setting condition (0 --> 1) | U-phase clearing condition (1 --> 0) | /U-phase setting condition (0 --> 1) | /U-phase clearing condition (1 --> 0) |
|---|---|---|---|---|---|
| up (0) | up (0) | coincidence detection signal 8 | — | — | coincidence detection signal 22/ delay signal 19 |
|  | down (1) | coincidence detection signal 8 | delay signal 19 | coincidence detection signal 22 | — |
| down (1) | up (0) | coincidence detection signal 22 | — | coincidence detection signal 8 | delay signal 19 |
|  | down (1) | — | coincidence detection signal 22/ delay signal 19 | coincidence detection signal 8 | — |

TABLE 2

| control signal 14 | control signal 15 | control |
|---|---|---|
| positive polarity (1) --> reversed polarity (0) | trigger input | set U-phase (0 --> 1) |
| reversed polarity (0) --> positive polarity (1) | trigger input | set /U-phase (0 --> 1) |

The output-polarity control circuit 13 controls the control signal 14 indicative of the output polarity of the PWM signal and the control signal 15 indicative of the timing of switching the output polarity. The control signals 14 and 15 are supplied to the waveform generating section 6, the selection circuit 18, the up-down counter 1, and the up-down counter 20. The control signal 15 is outputted at the timing when the output polarity of the PWM signal changes and controls the operation of the positive-phase delay circuit 5, the negative-phase delay circuit 16, the up-down counter 1, and the up-down counter 20.

The negative-phase delay circuit 16 starts a counting operation when either of the following two conditions (namely, the start conditions 1 and 2) is satisfied.

[Start Condition 1] When the count direction signal 9 is held at 1, the negative-phase delay circuit 16 starts the counting operation at the timing when the coincidence detection signal 8 is inputted.

[Start Condition 2] When the control signal 14 changes from 0 to 1, the negative-phase delay circuit 16 starts the counting operation at the timing when the control signal 15 is inputted.

In either case, the negative-phase delay circuit 16 outputs a delay signal 17 to the selection circuit 18 when the count reaches a set dead time value set for the lower arm.

The selection circuit 18 selects one of delay signals 10 and 17 in response to the control signal 14 and a discrimination signal 24 and outputs it to the waveform generating section 6 as a delay signal 19. Table 3 shows the relationship among the values of the control signal 14 and the discrimination signal 24 and signals selected as the delay signal 19.

TABLE 3

| PWM signal output polarity (control signal 14) | discrimination signal 24 | delay signal being selected (delay signal 19) |
|---|---|---|
| — | 0 | delay signal 10 |
| positive polarity (1) --> reversed polarity (0) | — | delay signal 10 |
| — | 1 | delay signal 17 |
| reversed polarity (0) --> positive polarity (1) | — | delay signal 17 |

Figure 4:
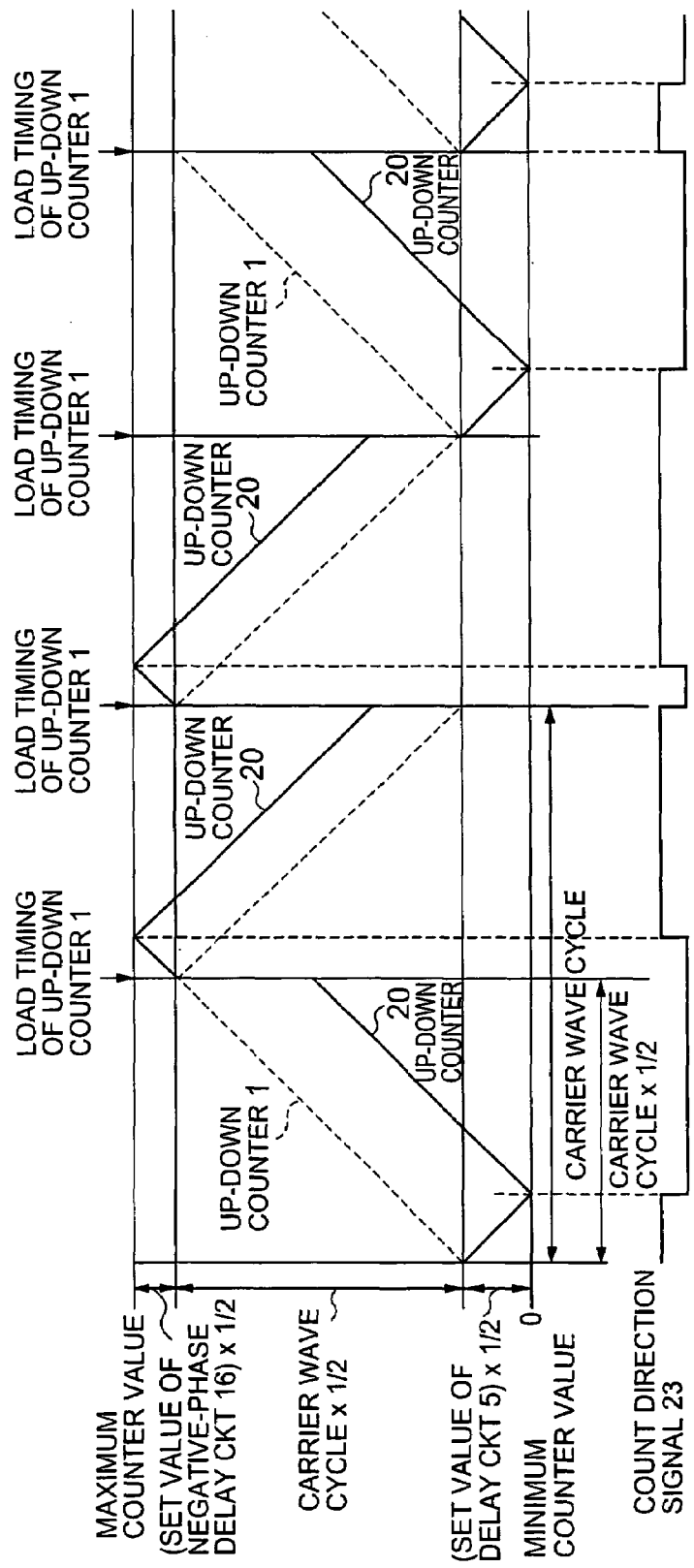
FIG. 4 is a diagram for explaining the operation of another up-down counter.

The up-down counter 20 is operated by the count clock 4 to perform an up-down counting operation in the range from 0 to ((the cycle of a carrier wave)/2+(the set value of the positive-phase delay circuit 5)/2+(the set value of the negative-phase delay circuit 16/2)). At that time, the up-down counter 20 performs the up-down counting operation as shown in FIG. 4. Specifically, the up-down counter 20 loads the value of the up-down counter 1 at the timing of switching the up-down counter 1 from up to down and the timing of switching from down to up.

Thus, the value ((the cycle of a carrier wave)/2+(the set value of the positive-phase delay circuit 5)/2)) is loaded by the up-down counter 20 at the timing of switching the up-down counter 1 from down to up. Also, the value ((the set value of the positive-phase delay circuit 5)/2) is loaded by the up-down counter 20.

The up-down counter 20 outputs the count direction signal 23. The count direction signal 23 takes "1" during down-count operation of the up-down counter 20, or while the count is increasing from the lower limit 0 to the upper limit ((the cycle of a carrier wave)/2+(the set value of the positive-phase delay circuit 5)/2+(the set value of the negative-phase delay circuit 16/2)). Conversely, the count signal 23 takes "0" during up-count operation, or while the count is decreasing from the upper limit to the lower limit.

The comparator 21 compares the value of the up-down counter 20 with the value of the comparing register 2. When both the values become equal to each other, the comparator 21 outputs the coincidence detection signal 22.

Figure 5:
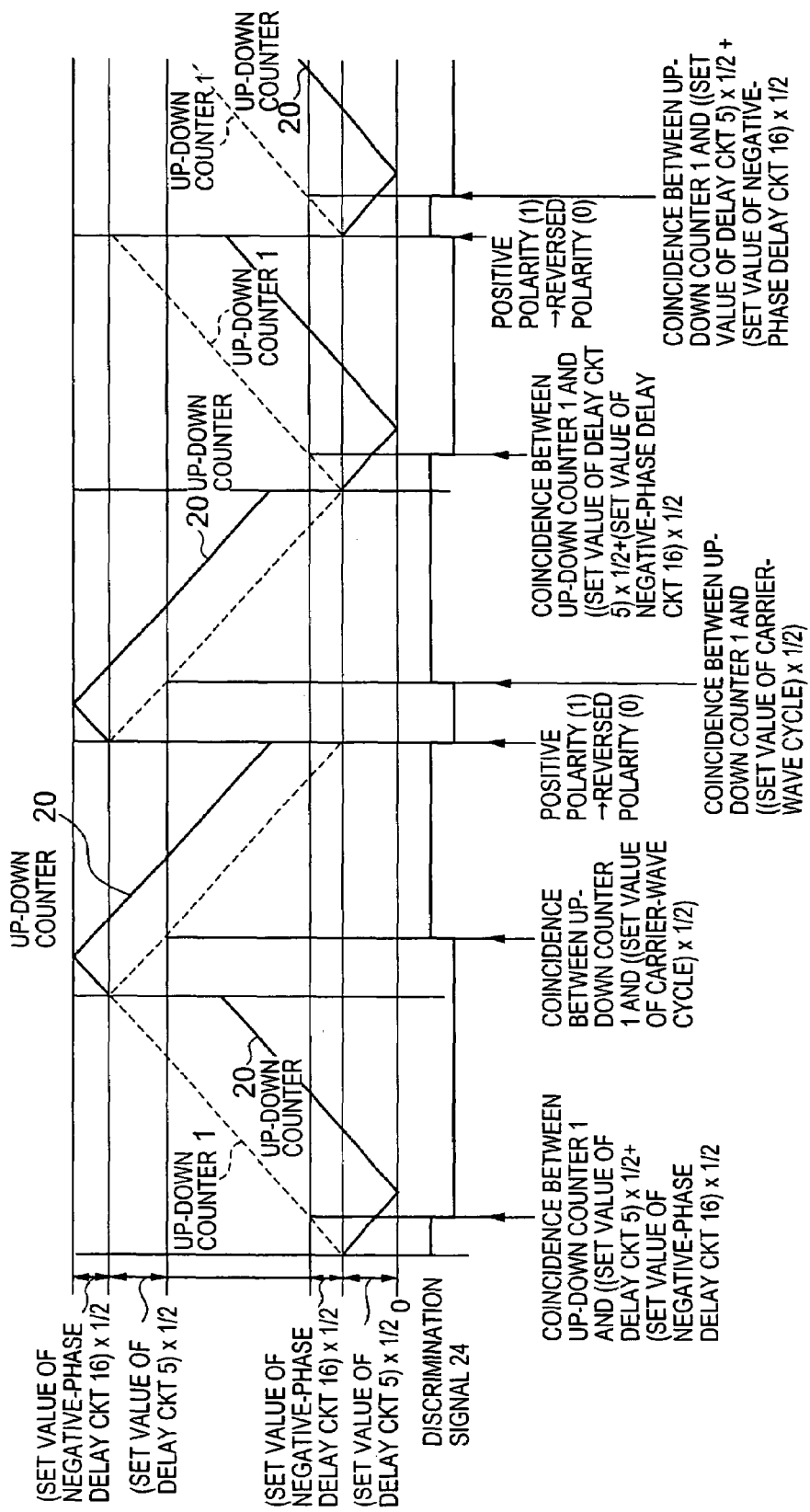
FIG. 5 is a diagram for explaining the operation of a discrimination circuit.

The discrimination circuit 25 outputs the discrimination signal 24 with reference to the count of the up-down counter 1. The discrimination signal 24 serves to control the selection of the delay signals 10 and 17 and is outputted according to (a) to (d), as shown in FIG. 5.

(a) When the up-down counter 1 is being executing up-count operation (the count direction signal 9=0) and the count becomes equal to ((the set value of the positive-phase delay circuit 5)/2+(the set value of the negative-phase delay circuit 16)/2), the discrimination signal 24 is cleared (1→0).

(b) When the up-down counter 1 is being executing down-count operation (the count direction signal 9=1) and the count becomes equal to ((the cycle of a carrier wave)/2), the discrimination signal 24 is set (0→1).

(c) When the output polarity of the control signal 14 changes from positive polarity (1) to reversed polarity (0), the discrimination signal 24 is cleared (1→0).

(d) When the output polarity of the control signal 14 changes from reversed polarity (0) to positive polarity (1), the discrimination signal 24 is set (0→1).

Figure 6:
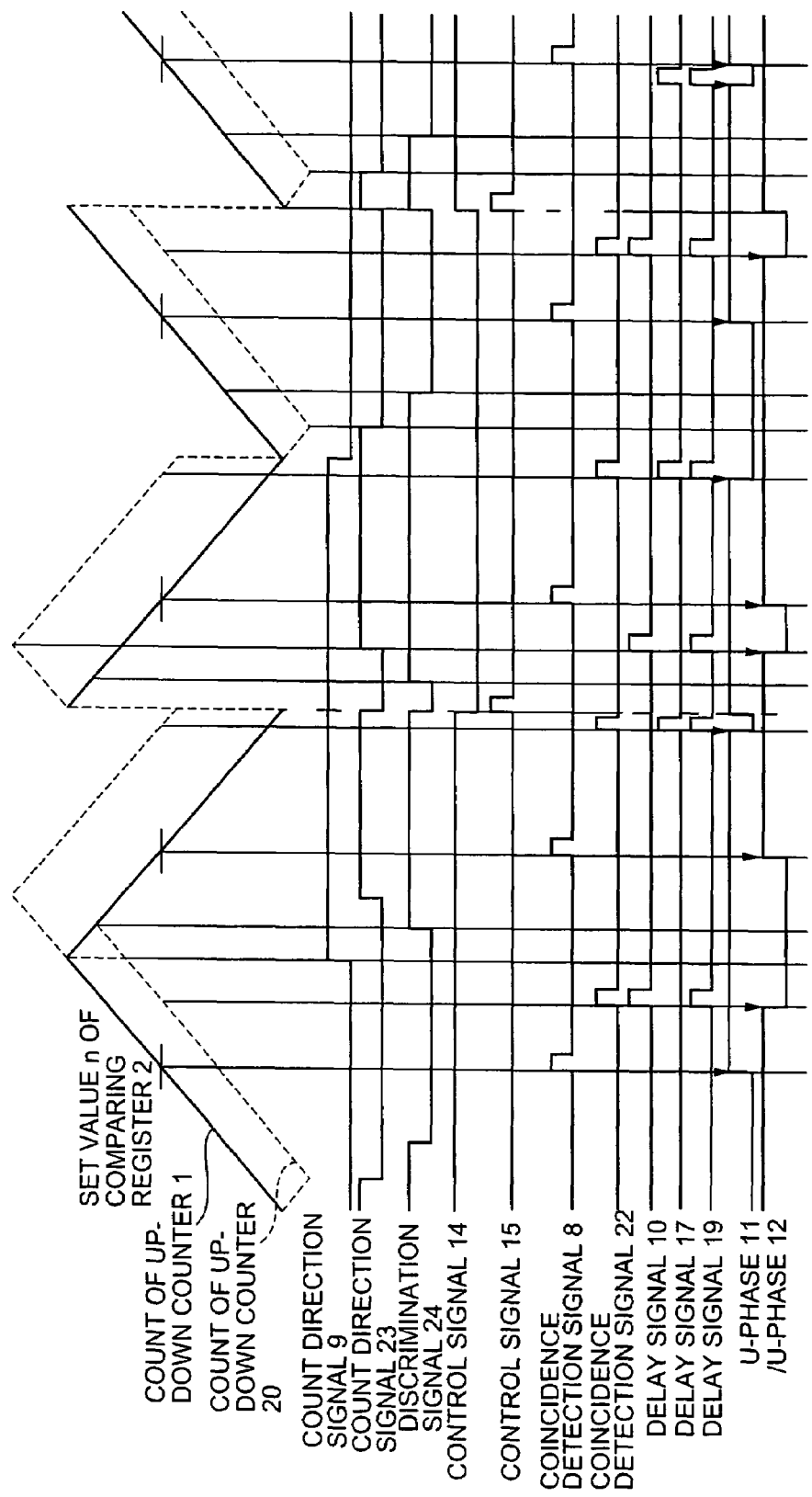
FIG. 6 is a diagram for explaining the operation of the three-phase pulse-width modulated waveform generator.

FIG. 6 shows the output control of the three-phase PWM waveform generator 100, as mentioned above. This output control allows different dead times to be set for the upper arm and the lower arm and also makes it possible to linearly control the PWM output in the range from 0 to 100%. Here it is assumed that U-phase and /U-phase signals are outputted. This also applies to the V-phase and /V-phase signals and W-phase and /W-phase signals.

[Second Embodiment]

Figure 7:
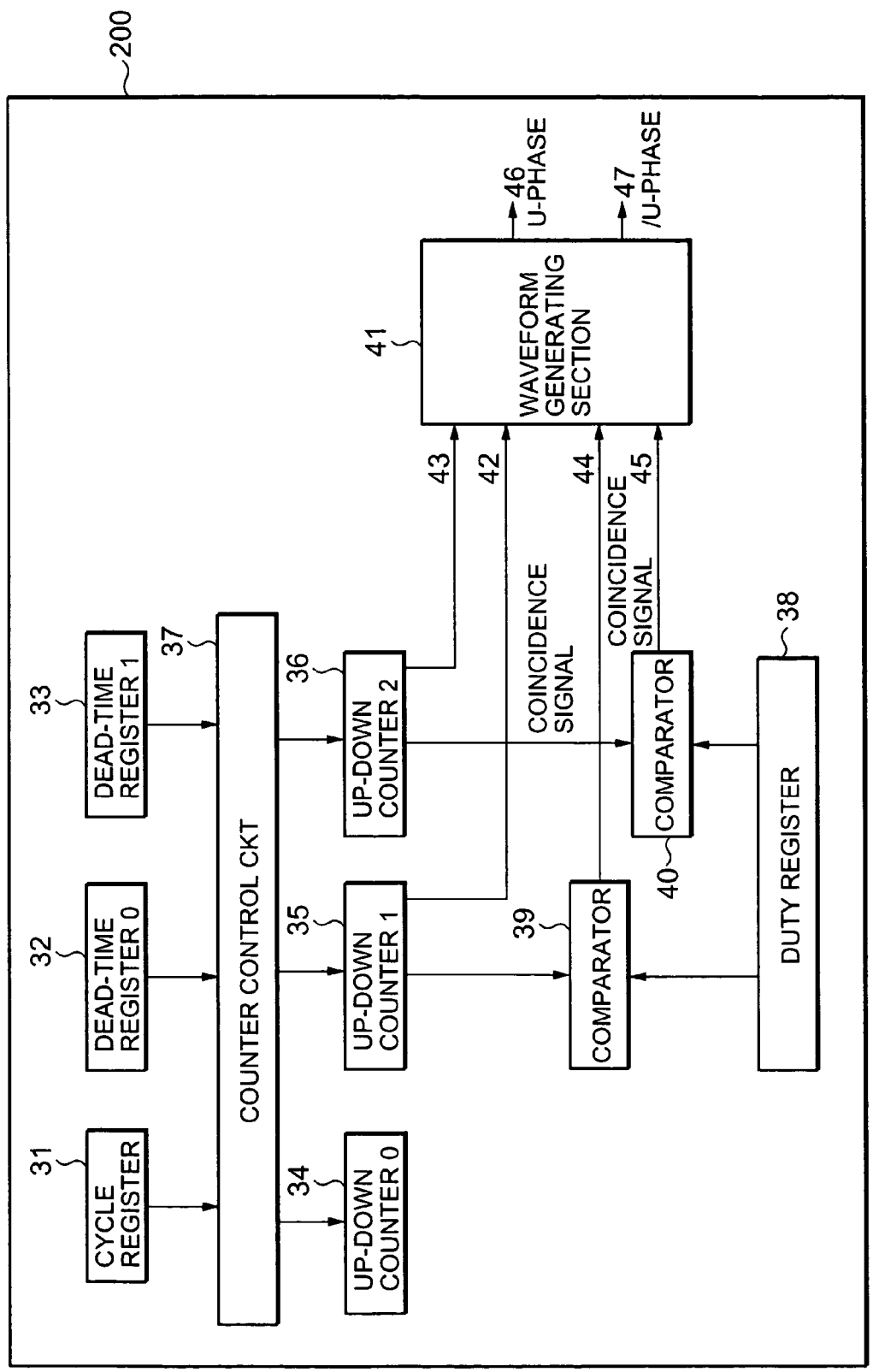
FIG. 7 is a functional block diagram for explaining the operation of a three-phase pulse-width modulated waveform generator according to a second embodiment of the invention.

Referring to FIG. 7, a three-phase PWM waveform generator 200 according to a second embodiment of the invention will be described. The three-phase PWM waveform generator 200 includes a cycle register 31, dead-time registers 32 and 33, up-down counters 34, 35, and 36, a counter control circuit 37, a duty register 38, comparators 39 and 40, and a waveform generating section 41.

In the cycle register 31, the value of (the cycle of a carrier wave)/2 is set.

To the dead-time register 32 (also referred to as a dead-time register 0), dead time (d0) at switching from positive phase OFF to negative phase ON is set.

To the dead-time register 33 (also referred to as a dead-time register 1), dead time (d1) at switching from negative phase OFF to positive phase ON is set.

The up-down counter 34 (also referred to as a counter 0) is a basic counter, which measures the cycle of the carrier wave. The counter 0 (34) counts up from d0/2 determined as the initial value and is switched to down-count operation at the time when the count becomes equal to ((the cycle of a carrier wave)/2+d0/2). Thereafter, the up-down counter 0 (34) is switched to up-count operation at the time when the count becomes equal to d0/2 and repeats this operation.

The up-down counter 35 (also referred to as a counter 1) is a counter that has a time difference corresponding to the dead time (d0) set for the dead-time register 32, relative to the up-down counter 34. The counter 1 counts up from (d0/2+d1/2) determined as the initial value and switches to down-count operation at the time when the count becomes equal to (the cycle of a carrier wave)/2+d1/2). Thereafter, the up-down counter 35 is switched to up-count operation at the time when the value agrees with (d0/2+d1/2) and repeats this operation. The counter 1 outputs the count to the comparator 39. The counter 1 also outputs a counter-1 direction signal 42 indicative of whether the operation is count-up or count-down, to the waveform generating section 41.

The up-down counter 36 (also referred to as a counter 2) is a counter that has a time difference corresponding to the dead time (d1) set for the dead-time register 33, relative to the up-down counter 34. The counter 2 counts down from (d0/2×d1/2) determined as the initial value and switches to up-count operation at the time when the count becomes equal to 0. Thereafter, the up-down counter 36 is switched to down-count operation at the time when the count agrees with the set value ((the cycle of a carrier wave)/2) of the cycle register and repeats this operation. The counter 2 (36) outputs a counter-2 direction signal 43 indicative of whether the operation is count-up or count-down, to the waveform generating section 41.

The counter control circuit 37 sets initial values for the up-down counters 34, 35, and 36, respectively, with reference to the cycle register 31 and the dead-time registers 32 and 33. The counter control circuit 37 also makes the up-down counters 35 and 36 perform counting operation with reference to the up-down counter 34.

The duty register 38 stores the duty width.

The comparator 39 compares the duty width set in the duty register 38 with the count of the up-down counter 35 and when they become equal to each other, it outputs a coincidence signal 44 to the waveform generating section 41.

The comparator 40 compares the duty width set in the duty register 38 with the count of the up-down counter 36 and when they become equal to each other, it outputs a coincidence signal 45 to the waveform generating section 41.

The waveform generating section 41 outputs a U-phase signal 46 and a /U-phase signal 47 in response to the counter-1 direction signal 42, the counter-2 direction signal 43, and the coincidence signals 44 and 45. The U-phase PWM waveform outputs "1" when the counter 1 becomes equal to the value of the duty register 38 during up-count operation and outputs "0" when the counter 1 becomes equal to the value of the duty register 38l during down-count operation. The /U-phase PWM waveform outputs "0" when the counter 2 becomes equal to the value of the duty register 38 during up-count operation and outputs "1" when the counter 1 becomes equal to the value of the duty register 38 during down-count operation.

Figure 8:
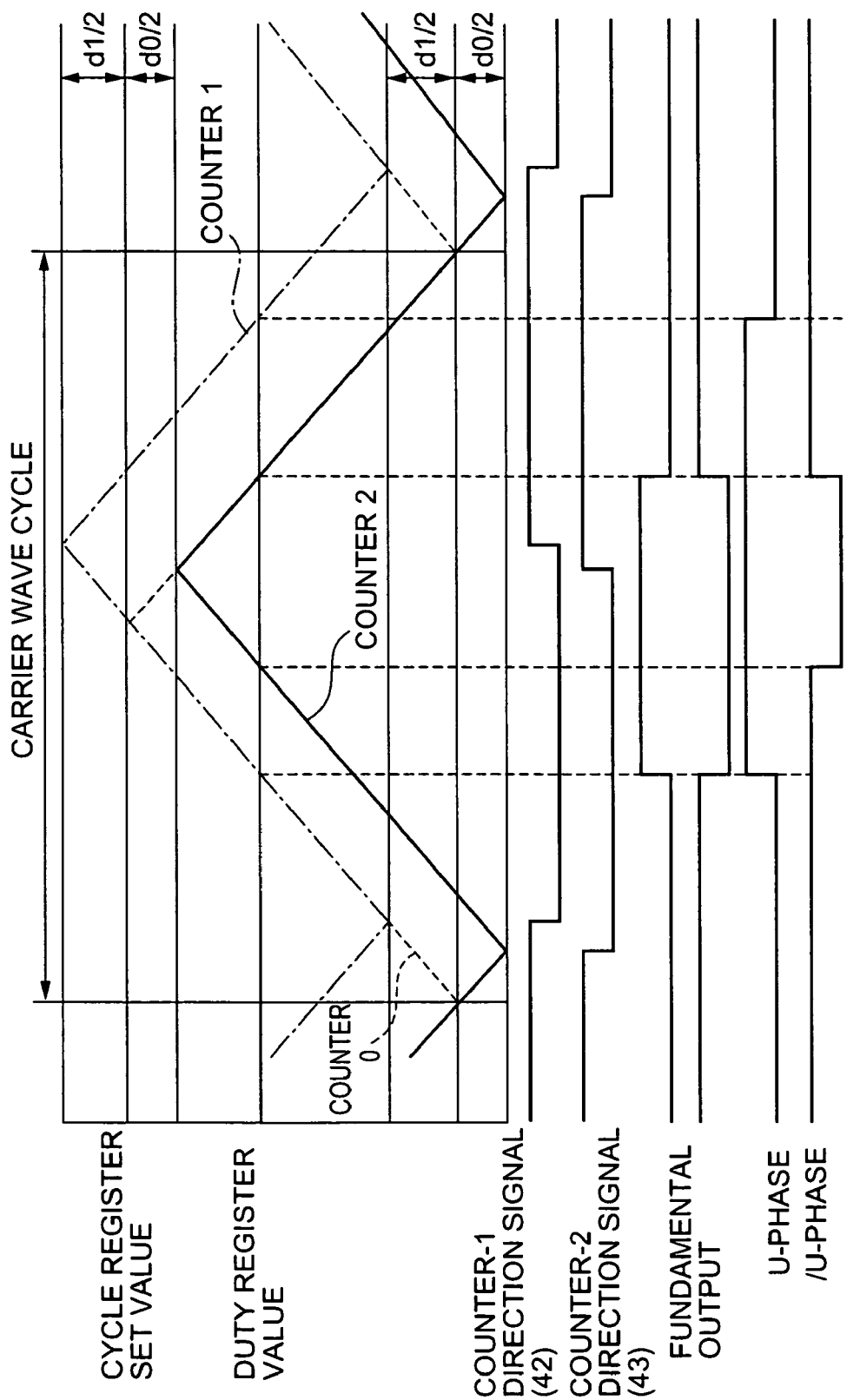
FIG. 8 is a diagram for explaining the operation of the three-phase pulse-width modulated waveform generator according to the second embodiment.
Figure 9:
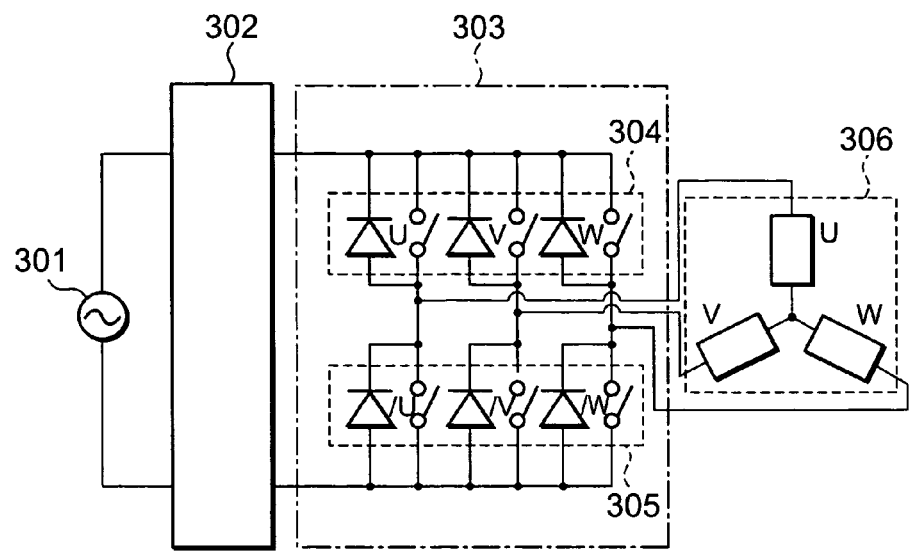
FIG. 9 is a functional block diagram of a PWM inverter for driving a three-phase motor.
Figure 10:
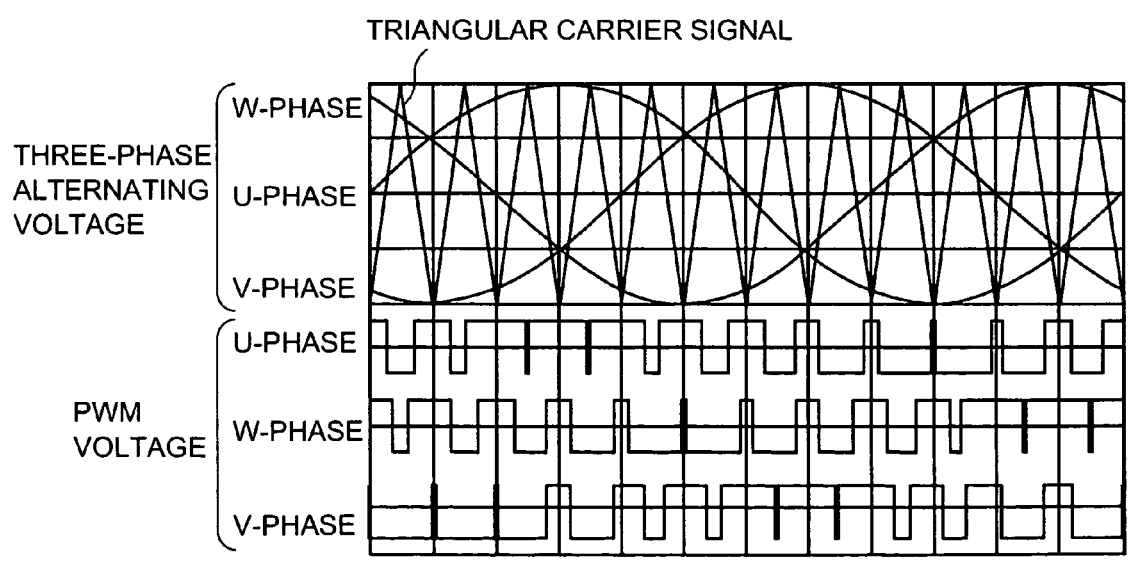
FIG. 10 is a graph showing a PWM voltage in U-phase, V-phase and W-phase generated by modulating the pulse width of a triangular carrier signal and a three-phase alternating voltage in U-phase, V-phase, and W-phase that is reconstructed from the PWM voltage.
Figure 11:
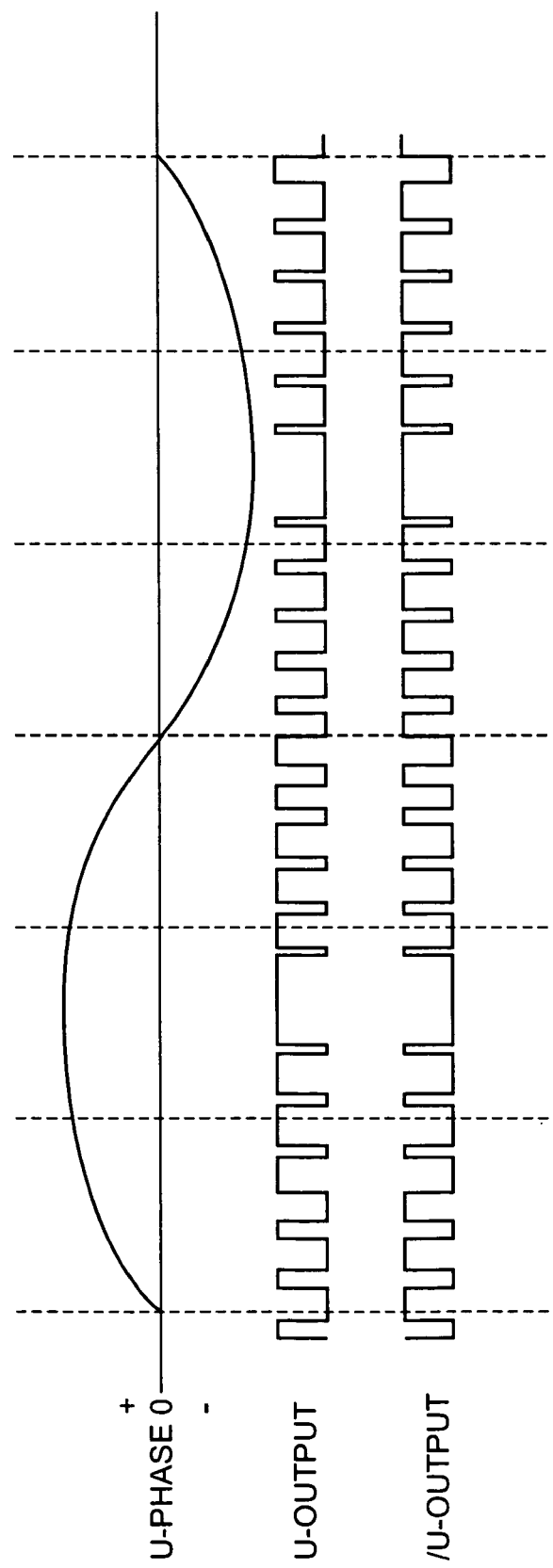
FIG. 11 is a diagram for explaining the complementary relationship between U-phase and /U-phase, V-phase and /V-phase, and W-phase and /W-phase.
Figure 12:
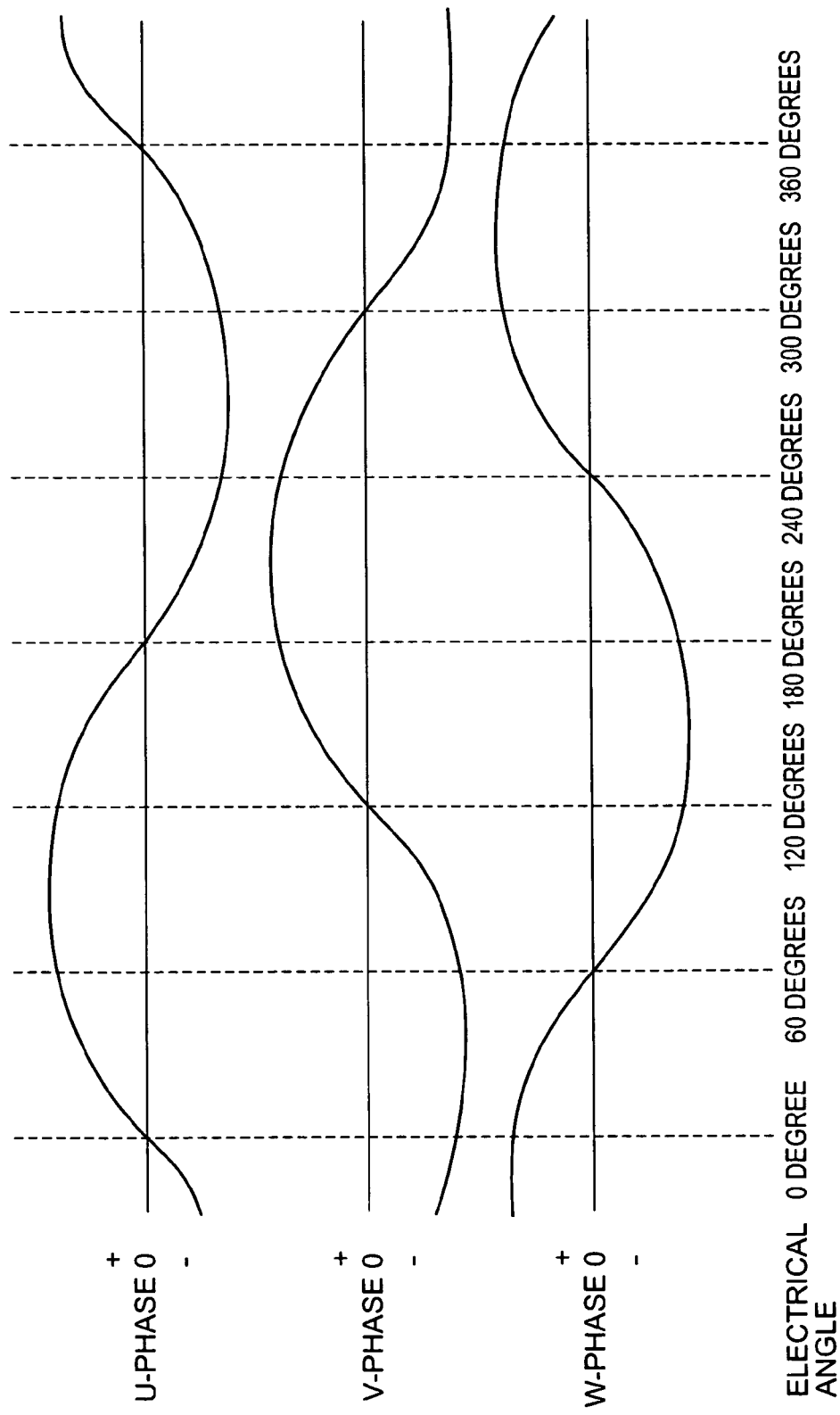
FIG. 12 is a diagram for explaining the phase difference among U-phase, V-phase, and W-phase.

As shown in FIG. 8, the three-phase PWM waveform generator 200 outputs the U-phase signal 46 and the /U-phase signal 47. The same applies to the generation of V-phase and /V-phase PWM signals and the generation of W-phase and /W-phase PWM signals, so that their description will be omitted.

Although the invention has been described based on the foregoing embodiments, it is to be understood that the invention is not limited to the above and various modifications and variations may be made within the scope of the knowledge of those skilled in the art.

What is claimed is:

1. A method of generating pulse-width modulated waveforms through a first terminal and a second terminal, the method comprising:
   the step 1 of determining the cycle of a carrier wave for the waveforms, a first dead time value, and a second dead time value;
   the step 2 of determining the range of counting by a plurality of up-down counters according to the carrier-wave cycle, the first dead time value, and the second dead time value;
   the step 3 of counting in the range determined by the up-down counters in the step 2;
   the step 4 of comparing a value determined according to the carrier-wave cycle with a first count value of a first one of the up-down counters;
   the step 5 of comparing a value determined according to the carrier-wave cycle with a second count value of a second one of the up-down counters other than the first up-down counter; and
   the step 6 of generating the pulse-width modulated waveforms through the first and the second terminals according to the comparison in the steps 4 and 5.

2. The method of generating the pulse-width modulated waveforms, according to claim 1, wherein
   the first dead time value is determined for the first terminal;
   the second dead time value is determined for the second terminal;
   the method further comprising the step of loading the first count value of the first up-down counter in the second up-down counter.

3. The method of generating the pulse-width modulated waveforms, according to claim 2, wherein
   the first up-down counter has a first count range determined by a first lower limit and a first upper limit and performs counting within the first count range;
   the first lower limit being equal to a half of the first dead time value while the first upper limit is equal to a sum of the half of the first dead time value and a half of the carrier-wave cycle;
   the second up-down counter having a second count range determined by a second lower limit and a second upper limit and performs counting in the second count range;
   the second lower limit being equal to zero while the second upper limit is equal to a sum of the half of the first dead time value, the half of the second dead time value, and the half of the carrier-wave cycle;
   the first count value being loaded in the second up-down counter when the first count value is equal to either of the first upper limit and the first lower limit.

4. The method of generating pulse-width modulated waveform, according to claim 1, wherein
   the first dead time value is indicative of a dead time of switching from OFF of a positive phase to ON of a negative phase;
   the second dead time value is indicative of a dead time of switching from OFF of the negative phase to ON of the positive phase; and
   when a third up-down counter measures the cycle of the carrier wave,
   the first up-down counter performs counting with a time difference of the first dead time value relative to the third up-down counter, and
   the second up-down counter performs counting with a time difference of the second dead time value relative to the third up-down counter.

5. The method of generating pulse-width modulated waveform, according to claim 4, wherein
   the first up-down counter performs counting in a range in which the sum of the first and second dead time values is a first lower limit and the sum of the first lower limit and a half of the carrier-wave cycle is a first upper limit; and
   the second up-down counter performs counting in a range in which zero is a second lower limit and a half of the carrier-wave cycle is a second upper limit.

6. An apparatus for generating pulse-width modulated waveforms through a first terminal and a second terminal, the apparatus comprising:
   a plurality of up-down counters that perform counting in a range determined according to a predetermined carrier-wave cycle, first dead time value, and second dead time value;
   a first comparator that compares a value determined according to the carrier-wave cycle with a first count value of a first one of the up-down counters;
   a second comparator that compares a value determined according to the carrier-wave cycle with a second count value of a second up-down counter other than the first up-down counter; and
   waveform generating means that generates pulse-width modulated waveform according to the outputs of the first and the second comparators.

7. The apparatus for generating the pulse-width modulated waveforms, according to claim 6, wherein
   the first dead time value is determined for the first terminal;
   the second dead time value is determined for the second terminal; and
   the apparatus further comprises means for loading the first count value of the first up-down counter in the second up-down counter.

8. The apparatus for generating pulse-width modulated waveform according to claim 7, wherein:
the first up-down counter performs counting in a range in which a half of the first dead time value is a first lower limit and the sum of a half of the first dead time value and a half of the carrier-wave cycle is a first upper limit;
the second up-down counter performs counting in a range in which zero is a second lower limit and the sum of a half of the first dead time value, a half of the second dead time value, and a half of the carrier-wave cycle is a second upper limit; and
when the first count value is either of the first upper limit and the first lower limit, the loading means loads the first count value in the second up-down counter.

9. The apparatus for generating pulse-width modulated waveform according to claim 6, wherein
the first dead time value is indicative of a dead time of switching from OFF of a positive phase to ON of a negative phase;
the second dead time value is indicative of a dead time of switching from OFF of the negative phase to ON of the positive phase; and
the apparatus includes a third up-down counter that measures the cycle of the carrier wave as one of the plurality of up-down counters; wherein
the first up-down counter performs counting with a time difference of the first dead time value relative to the third up-down counter, and
the second up-down counter performs counting with a time difference of the second dead time value relative to the third up-down counter.

10. The apparatus for generating pulse-width modulated waveform according to claim 9, wherein
the first up-down counter performs counting in a range in which the sum of the first and second dead time values is a first lower limit and the sum of the first lower limit and a half of the carrier-wave cycle is a first upper limit; and
the second up-down counter performs counting in a range in which zero is a second lower limit and a half of the carrier-wave cycle is a second upper limit.

11. An apparatus for generating multiphase alternating pulse-width modulated waveform, the apparatus comprising a pulse-width modulated waveform generation apparatus comprising:
a plurality of up-down counters that perform counting in a range determined according to a predetermined carrier-wave cycle, first dead time value, and second dead time value;
a first comparator that compares a value determined according to the carrier-wave cycle with a first count value of a first one of the up-down counters;
a second comparator that compares a value determined according to the carrier-wave cycle with a second count value of a second up-down counter other than the first up-down counter; and
waveform generating means that generates pulse-width modulated waveform according to the outputs of the first and the second comparators.

12. A multiphase alternating-current motor that is driven by the apparatus for generating the multiphase alternating pulse-width modulated waveform according to claim 11.

* * * * *